United States Patent [19]

Wright

[11] Patent Number: 4,668,058
[45] Date of Patent: May 26, 1987

[54] WEATHER SHIELD FOR SIDE-MOUNTED, REAR-VIEW, TRACTOR-TRAILER MIRROR

[76] Inventor: James N. Wright, Rte. 3, Box 330, Wytheville, Va. 24382

[21] Appl. No.: 777,401

[22] Filed: Sep. 18, 1985

[51] Int. Cl.⁴ .......................... G02B 7/18; G02B 5/08; B60R 1/06
[52] U.S. Cl. .................................................. 350/582
[58] Field of Search ............... 350/582, 584, 587, 580; D6/300; 296/84 B

[56] References Cited

FOREIGN PATENT DOCUMENTS 863600 1/1953 Fed. Rep. of Germany ...... 350/582

Primary Examiner—Jon W. Henry
Attorney, Agent, or Firm—W. Brown Morton, Jr.; W. Brown Morton, Jr.

[57] ABSTRACT

A device is disclosed formed in one piece from a flexible material, such as stainless steel, which wraps around the outside of a large rectangular side-mounted rear view mirror, of the type commonly found on tractor trailer trucks and similar vehicles, and comprises a visor portion which extends rearwardly from the top of the mirror and a side portion which extends downwardly from the visor portion to provide a tapered shield along three-quarters of the cab side edge of the mirror, such that rain, snow, slush and the like, as well as road chemicals, are successfully prevented from falling down on or splashing up on the face of the rear view mirror.

3 Claims, 5 Drawing Figures

WEATHER SHIELD FOR SIDE-MOUNTED, REAR-VIEW, TRACTOR-TRAILER MIRROR

FIELD OF THE INVENTION

This invention relates to a weather shield for the large side-mounted rear view mirrors on tractor trailer/trucks and similar vehicles.

BACKGROUND OF THE INVENTION

Since the development of the wind scoop on tractor trailer trucks, such scoop appearing on top of the tractor to deflect the wind resistance of the trailer, what has occurred is that in rainy, slushy or snowy weather, the water or slush or snow, along with salt from the road, runs down off the wind scoop across the top of the cab along the connecting bars of the side-mounted rear view mirrors and then runs down and across the face of the mirrors themselves so that the driver has no rear vision whatever.

The rear-view mirrors on tractor-trailer cabs may be, for example, and often are, 16½ inches long and 7 inches wide. There is a specific point on the inside of these mirrors, which I will call the weather margin, where precipitation and road film tend to land. Water never runs from the top down unless the truck is completely stopped. Nor does it come from the outside of these mirrors. It always comes from the inside because of the way the mirrors are angled so that the driver can have proper vision.

The top of my device, for the example cited, covers 9½ inches over the top of these mirrors, coming just below the curve in the glass, with an inside shield of 12 inches to prevent bad weather from impairing the vision of a driver. The visor that covers the top of these mirrors is 4¼ inches deep. My shield is a continuous piece stretching for 21½ inches. It was not designed to dress up or improve the looks of these mirrors, but to do a job which has been needed for years. It does it efficiently and economically.

DESCRIPTION OF THE PRIOR ART

The prior art discloses a number of rear view mirror shields, but they are mostly designed for automobile usage, and their practicality for use on tractor trailers is limited, even allowing for modification of their design to fit the rectangular mirrors of tractor trailer cabs. For example, among existing patents for mirror shields, the closest to my design, to my knowledge, are U.S. Pat. Nos. 2,691,920 and 2,622,481. The first of these, invented by Curcuru, entails a visor and two narrow strips that encase a mirror. This invention was designed for use on round mirrors, and could not be successfully adapted for truck use even if the side strips or "flanges" were lengthened, because the strips are too narrow to deflect water and road chemicals running off from the wind scoop. The second invention cited above, that of Triphahn, was intended for truck as well as automobile usage, as shown by FIGS. 6 and 7 in the patent. There the shield covers approximately 4 inches of both sides of the mirror, and is similar in design to a sun visor. The weather margin referred to earlier starts just below where this visor ends. If this particular shield were to stretch the full length of a truck mirror, it would cover so much of the glass that the driver would be left with only a narrow strip of glass from which to obtain rear vision. U.S. Pat. No. 3,612,647 should also be noted, as it discloses a rear view mirror and enclosure specifically intended for use on trucks and buses, and features a wiper blade and a heating element in the rotatable housing for the rear view mirror. The emphasis of this invention is on clearing off weather debris once it has already accumulated on the mirror or mirror case, rather than on preventing the accumulation in the first place. Many truck mirrors currently are equipped with heaters. These work fine in rain, but in snow and ice, when salt and road chemicals are on the road, the heaters bake such salt and chemicals onto the face of the mirror, making it impossible to see. My shields have been tested in all types of weather. Their design keeps these mirrors completely dry without the need for running the mirror heaters. Yet a further drawback of the invention disclosed in U.S. Pat. No. 3,612,647 for a commercial vehicle making frequent short runs is that the number of mirrors that are broken every day make it highly expensive. One truck mirror with a heating element already installed costs around $58.00. The cost of a pair of my weather shields would be around a fourth of that.

OBJECTS OF THE INVENTION

It is a principal object of the present invention to provide a new and improved means for shielding the large side-mounted rear view mirrors on tractor trailer trucks and similar vehicles from rain, slush, snow and the like, and more particularly to deflect such precipitation as may run off from or be blown off from the wind-scoop on top of the cab of such vehicles.

It is a further object of the present invention to provide a rear view mirror weather shield which can be easily attached to tractor trailer trucks and similar vehicles already in operation.

It is a further object of the present invention to provide a rear view mirror weather shield which is very economical, yet highly efficient.

SUMMARY

A weather shield for the large, rectangular side-mounted rear view mirrors of tractor trailer trucks and similar vehicles. The device, in a preferred form, consists of a continuous piece of flexible material, such as 26 gauge stainless steel, 21½ inches in length, cut so that the topmost 9½ inches form a generally horizontal visor 4½ inches deep at its greatest width, and the remaining 12 inches form a generally vertical inside shield tapering from 2 inches to 1 inch in width. A rubber gasket runs along the entire inner edge of the device to provide a waterproof seam with the mirror frame. The device wraps around the exterior of the mirror casing of a rear view mirror in such a way that the widest part of the visor is directly over the top center of the mirror. A hole in the device allows it to fit over the top mirror mount, and eight sheet metal screws attach said device to the mirror casing.

The above-described features of the present invention are explained in the detailed description below. It is to be read in conjunction with the accompanying drawings.

The invention is useful to drivers of tractor trailer trucks and similar vehicles who presently have no completely reliable means to assure an unimpeded view to the rear in poor driving conditions. The rear view hazard is even greater for drivers of vehicles with wind scoops. The invention herein will keep the rear view mirrors of tractor trailer vehicles free of all precipitation and road film, thereby promoting safety. Additional attributes are that they will be easy to install and very economical.

DETAILED DESCRIPTION OF DRAWINGS

Figure 1:
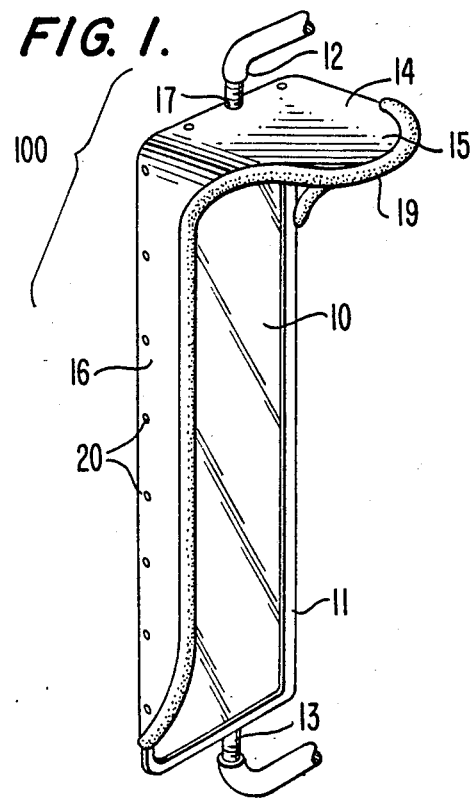
FIG. 1 shows a perspective view of the device from a position to the inside of and facing a right side rear view mirror, i.e., one mounted on the passenger side of the cab of a left hand drive vehicle.
Figure 2:
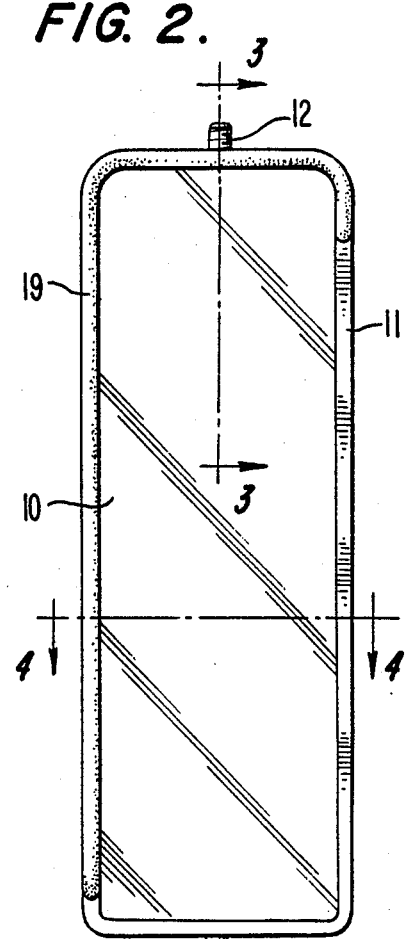
FIG. 2 shows a straight-on front view of the device.
Figure 3:
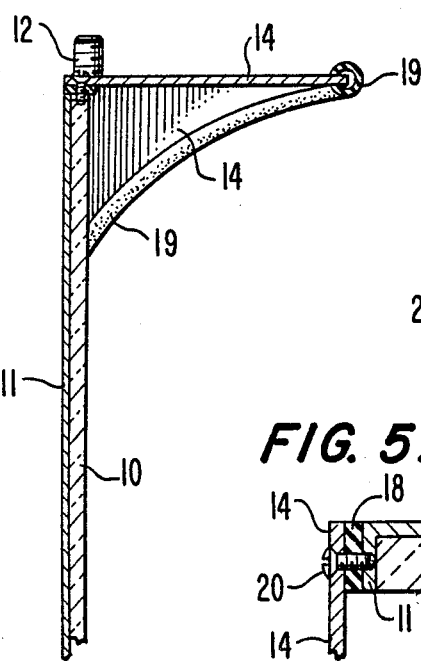
FIG. 3 shows a sectional view taken on the line 3—3 of FIG. 2.
Figure 4:
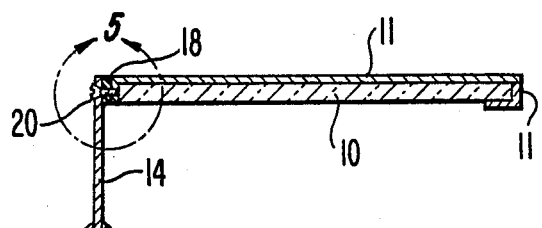
FIG. 4 shows a sectional view taken on the line 4—4 of FIG. 2.
Figure 5:
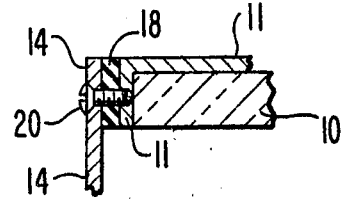
FIG. 5 shows an exploded view of the area encircled with a line marked "5" in FIG. 4.

FIG. 1 presents an overall view of a rear view mirror of the large rectangular shape commonly found on tractor trailer trucks and the like, 100. The mirror consists of a piece of mirrored glass, 10, in a mirror case 11, and is attached to the cab of the vehicle through the use of mirror mounts, 12, 13.

The invention described herein forms a protective weather shield for the mirrored glass 10 of the rear view mirror device 100. It consists of a continuous piece of flexible material 14, using 26 gauge stainless steel in the preferred embodiment, shaped so that when attached to the mirror case 11 its top-most portion forms a horizontal visor, 15, and the remainder forms a tapering vertical side shield 16. The shield portion 16 is on the "in" or cab side of the glass 10. The dimensions of a preferred embodiment of the invention for installation to protect a rectangular rear view glass 10 16½ inches long by 7 inches wide are approximately as follows: overall length of the material 14 is 21½ inches; visor transverse length is 9½ inches; visor transverse depth is 4¼ inches at midpoint; inside shield 16 is 12 inches long and tapers from about 2 inches in width where it joins the visor to about 1 inch in width for the greater part of its downward vertical run.

There is a hole 17 in the back edge of the material 14 at the midpoint of the visor to allow the shield it forms to fit over the upper mirror mount 12.

A rubber gasket 18 is provided to effect a tight seal between the shield and the mirror casing 11.

A split rubber tube 19, approximately 3/16 of an inch in diameter in the preferred embodiment, may be fitted around the outer edge of the shield to form a beading to keep the stainless steel from cutting hands and face.

The shield may be connected to the mirror casing 11 by sheet metal screws 20, and holes for the screws are provided in the material 14, for convenience of mounting the shield to an existing mirror installation.

I claim:

1. A weather shield for a side-mounted, rear-view, tractor-trailer mirror comprising a continuous piece of sheet material attached to and extending rearwardly from the mirror case having a topmost portion forming a horizontal visor and a vertical side portion along the cab side edge of the mirror, said visor extending at its midpoint a substantial distance from the face of the mirror and said side portion extending downwardly from the visor for three-quarters of the length of the mirror, said side portion tapering from a width where it joins the visor of approximately one half the depth of the visor at its midpoint into a run for most if its length of approximately one quarter of said depth, said shield accommodating the top mirror mount connecting the mirror to the vehicle and sealed to the mirror by gasket means.

2. A weather shield according to claim 1 in which the sheet material is flexible stainless steel.

3. A weather shield according to claim 2 in which the rearward edge of the sheet material is covered by a protective beading.

* * * * *